(12) United States Patent
Jafari (10) Patent No.: US 7,935,886 B2
(45) Date of Patent: May 3, 2011

(54) ADJUSTABLE VARIABLE RING FOR ELECTRICAL JUNCTION BOXES

(75) Inventor: Afshin Jafari, Los Angeles, CA (US)

(73) Assignee: Orbit Industries, Inc., Los Angeles, CA (US)

( * ) Notice: Subject to any disclaimer, the term of this patent is extended or adjusted under 35 U.S.C. 154(b) by 219 days.

(21) Appl. No.: 12/369,612

(22) Filed: Feb. 11, 2009

(65) Prior Publication Data

US 2010/0084155 A1   Apr. 8, 2010

Related U.S. Application Data (60) Provisional application No. 61/103,483, filed on Oct. 7, 2008.

(51) Int. Cl.
*H02G 3/08* (2006.01)

(52) U.S. Cl. ............ 174/58; 174/50; 174/57; 174/53; 174/480; 174/481; 439/535; 248/96; 248/343

(58) Field of Classification Search .......... 174/50, 174/53, 57, 58, 66, 67, 480, 481; 220/3.2, 220/3.3, 3.94, 4.02, 3.7, 3.9; 248/96, 343, 248/906; 439/535; D8/353; D13/173, 187
See application file for complete search history.

(56) References Cited

U.S. PATENT DOCUMENTS

| | | | | |
|---|---|---|---|---|
| 4,794,207 A * | 12/1988 | Norberg et al. | ............... | 174/505 |
| 5,042,673 A * | 8/1991 | McShane | ................ | 220/3.7 |
| 6,590,155 B2 * | 7/2003 | Vrame et al. | ................ | 174/50 |
| 6,666,419 B1 * | 12/2003 | Vrame | ................ | 248/200.1 |
| 7,166,801 B1 * | 1/2007 | Gretz | ................ | 174/53 |
| 2008/0035363 A1 | 2/2008 | Yan | | |

* cited by examiner

*Primary Examiner* — Dhiru R Patel
(74) *Attorney, Agent, or Firm* — Paul J. Backofen, Esq.; Crockett & Crockett, PC (57) ABSTRACT

An adjustable variable ring for electrical junction boxes including a base frame having a guide tab; a sliding insert having a box shaped frame, the sliding insert being configured to slide in and out of the base frame. A ratchet mechanism having a ratchet plate on the base frame including a plurality of steps, and a ratchet spring installed on an inner wall of the box shaped frame including an angled end tab and an angled mid tab protruding from the box shaped frame for engaging one or more of the plurality of steps. The sliding insert is configured to slide in and out of the base frame by disengaging the mid tab from the one or more of the steps by pressing on the end tab, and locks in the base frame by engaging the mid tab with the one or more of the steps.

20 Claims, 10 Drawing Sheets

ADJUSTABLE VARIABLE RING FOR ELECTRICAL JUNCTION BOXES

CROSS-REFERENCE TO RELATED APPLICATION

This patent application claims the benefit of the filing date of U.S. Provisional Patent Application Ser. No. 61/103,483, filed Oct. 7, 2008 and entitled "AUTOMATIC VARIABLE PLASTER RING (AVR)", the entire content of which is hereby expressly incorporated by reference.

FIELD OF THE INVENTION

This invention relates to the general area of electrical wiring where the building codes require the use of metal conduit, and more specifically to an electrical junction box for running electrical wires therein.

BACKGROUND

Typically, different types of electrical switches and receptacles are mounted on a plaster or mud ring which is bolted on the junction box. Because of different finished wall thicknesses, there are several sizes of plaster rings that have a protruded collar around their central opening where they receive the receptacles or switches. The protrusions must be raised to the thickness of the finished wall surface so that it would sit flush with the surface of the wall.

U.S. Pat. Pub. No. 2008/0035363 A1 to Yan, discloses an adjustable mud ring system that is somewhat adjustable by two screws on the back. However, adjusting the ring with the screws takes time and may not be sufficiently accurate due to mismatch of the level of adjustment of each screw.

The conventional systems of using fixed, one piece plaster rings, or rings adjustable by screws present a lot of difficulties and expenses where the finished material or thickness of the wall is not predictable. Furthermore, for the fixed, one piece rings, if future construction or remodeling is provisioned, the cost of removing the plaster ring is relatively high. Also, installing of the conventional systems takes a substantially long time due to the required adjustment for the wall thickness.

Therefore, there is a need for an improved and adjustable electrical junction box that can be effectively adjusted based on the thickness of the surface it is being installed on, and quickly installed.

SUMMARY

In some embodiments, the present invention is an adjustable variable ring (AVR), which can be used for electrical wiring where the building codes require the use of conduit for running electrical wires, which terminate at an electrical junction box.

In some embodiments, the present invention is an adjustable variable ring for electrical junction boxes. The adjustable variable ring includes a base frame having a guide tab; a sliding insert having a box shaped frame, a through opening, and a tab opening on a side of the box shaped frame, the sliding insert being configured to slide in and out of the base frame in the through opening using the guide tab; and a ratchet mechanism having: a ratchet plate secured to the base frame by an inner surface of the ratchet plate, and including a plurality of steps on an outer surface, and a ratchet spring installed on an inner wall of the box shaped frame and having a first end and a second end, ratchet spring including an angled end tab at the first end, an angled mid tab between the first end and the second end and protruding from inner wall of the box shaped frame to an outside of the box shaped frame through the tab opening for engaging one or more of the plurality of steps. The sliding insert is configured to slide in and out of the base frame by disengaging the mid tab from the one or more of the steps by pressing on the end tab, and locks in the base frame by engaging the mid tab with the one or more of the plurality of steps.

In some embodiments, the present invention further includes a second ratchet mechanism installed opposite to the ratchet mechanism. The sliding insert in these embodiments is configured to slide in and out of the base frame by disengaging the mid tabs of the ratchet mechanism and the second ratchet mechanism from the one or more of the steps by pushing the end tabs of the ratchet mechanism and the second ratchet mechanism towards one another, or vise versa.

The box shaped frame and the through opening may be rectangular shaped, circular shaped, or any other shape to accommodate an electrical junction box.

The ratchet spring may be installed on an inner wall of the box shaped frame by being snapped on, welded, riveted, or stamp joined on the box shaped frame. Also, the ratchet spring may be made of electrically conductive spring metal material and may include a second opening at the first end for finger grip.

DETAIL DESCRIPTION

In some embodiments, the present invention is an adjustable variable ring for electrical junction boxes, which includes a ratchet mechanism that enables auto adjustability of the plaster ring protrusion to a finished surface, such as a wall so that it would stand flush with the surface. The unique and useful design of the invention enhances its application in conjunction with shallow outlet boxes as well as deep boxes, for example, 4", 4¹¹⁄₁₆", and Three Gang through Ten Gang boxes. The invention accommodates variable thicknesses of different surface materials with different thicknesses, such as a variety of drywall thicknesses. Using the AVR of the present invention eliminates manufacturing, purchase and storage of different sizes of plaster rings. Most importantly, the invention drastically cuts down the installation time to a few seconds, from a couple of minutes.

Figure 1:
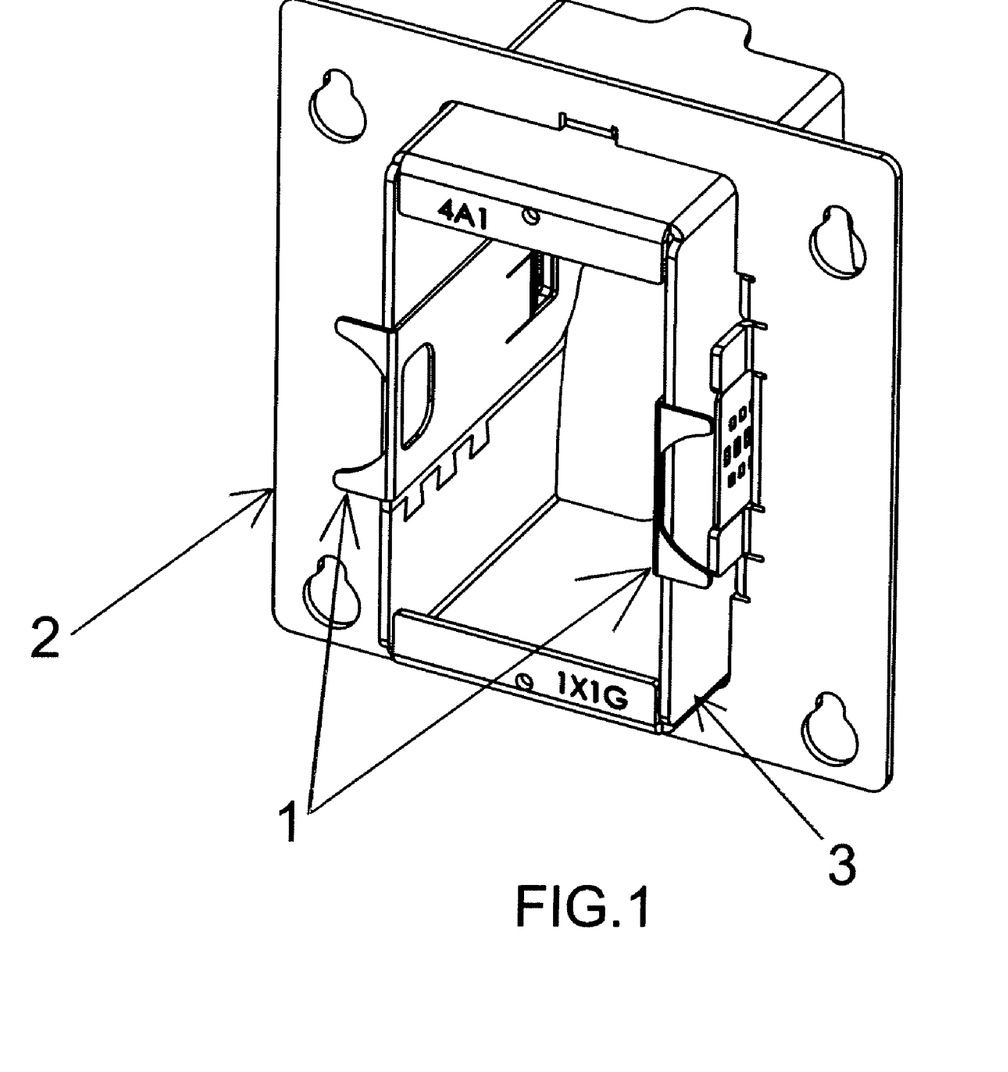
FIG. 1 is a trimetric view of an AVR, according to some embodiments of the present invention.
Figure 10:
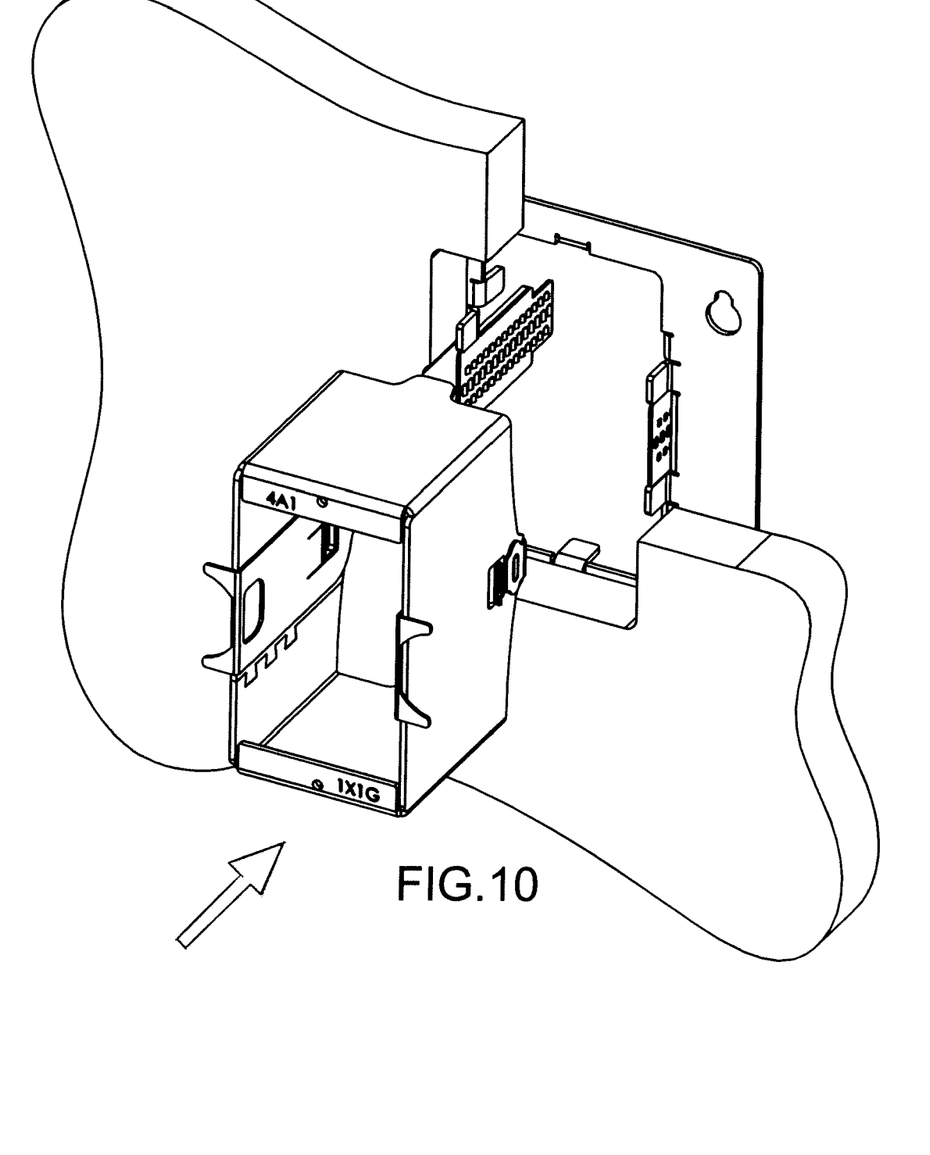
FIG. 10 shows an exemplary entire AVR assembly before sliding the insert assembly on the wall, according to some embodiments of the present invention.
Figure 11:
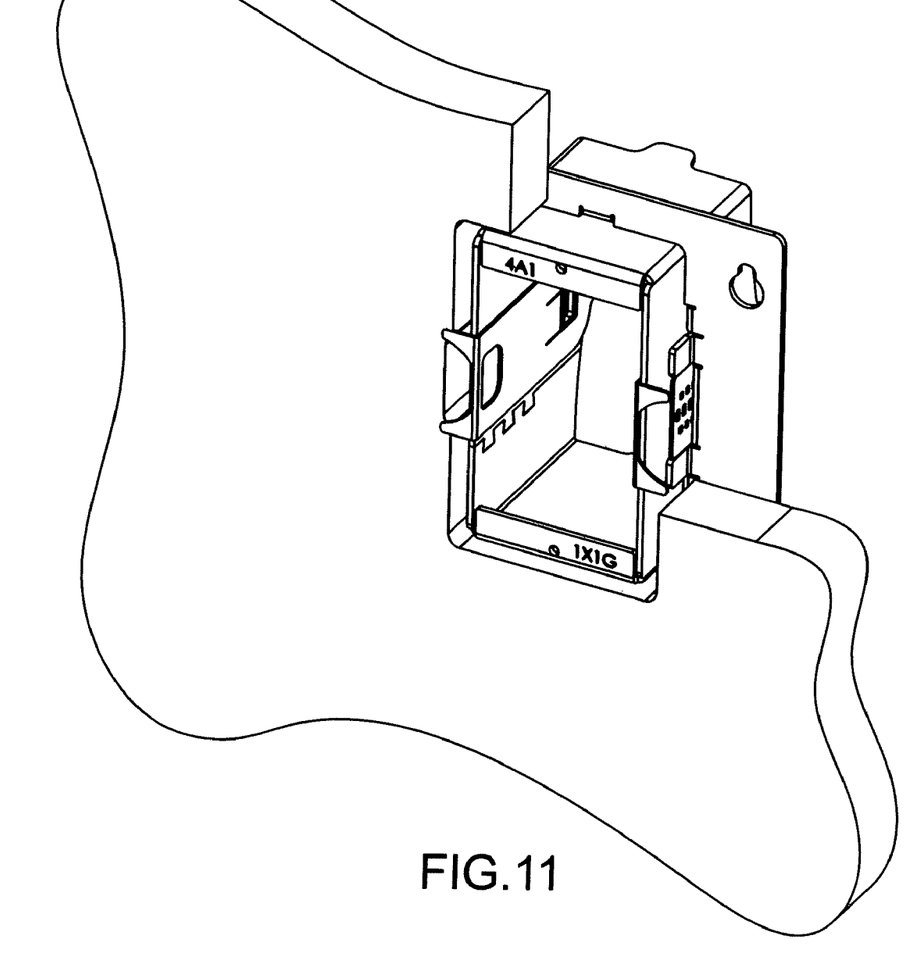
FIG. 11 shows an exemplary entire AVR assembly fully installed and secured in place on the wall, according to some embodiments of the present invention.

FIG. 1 is a trimetric view of an AVR, according to some embodiments of the present invention. As shown, the AVR includes a pair of ratchet mechanisms 1, a stationary base frame 2, and a sliding boxed shaped insert 3. The stationary frame is installed on a surface, for example, a wall and the sliding insert is adjusted to the thickness of the wall by the pair of ratchet mechanism, as shown in FIGS. 10 and 11. The ratchet mechanisms 1, base frame 2, and a sliding insert 3 may be made of metal, plastic, and/or other suitable material(s).

Figure 2:
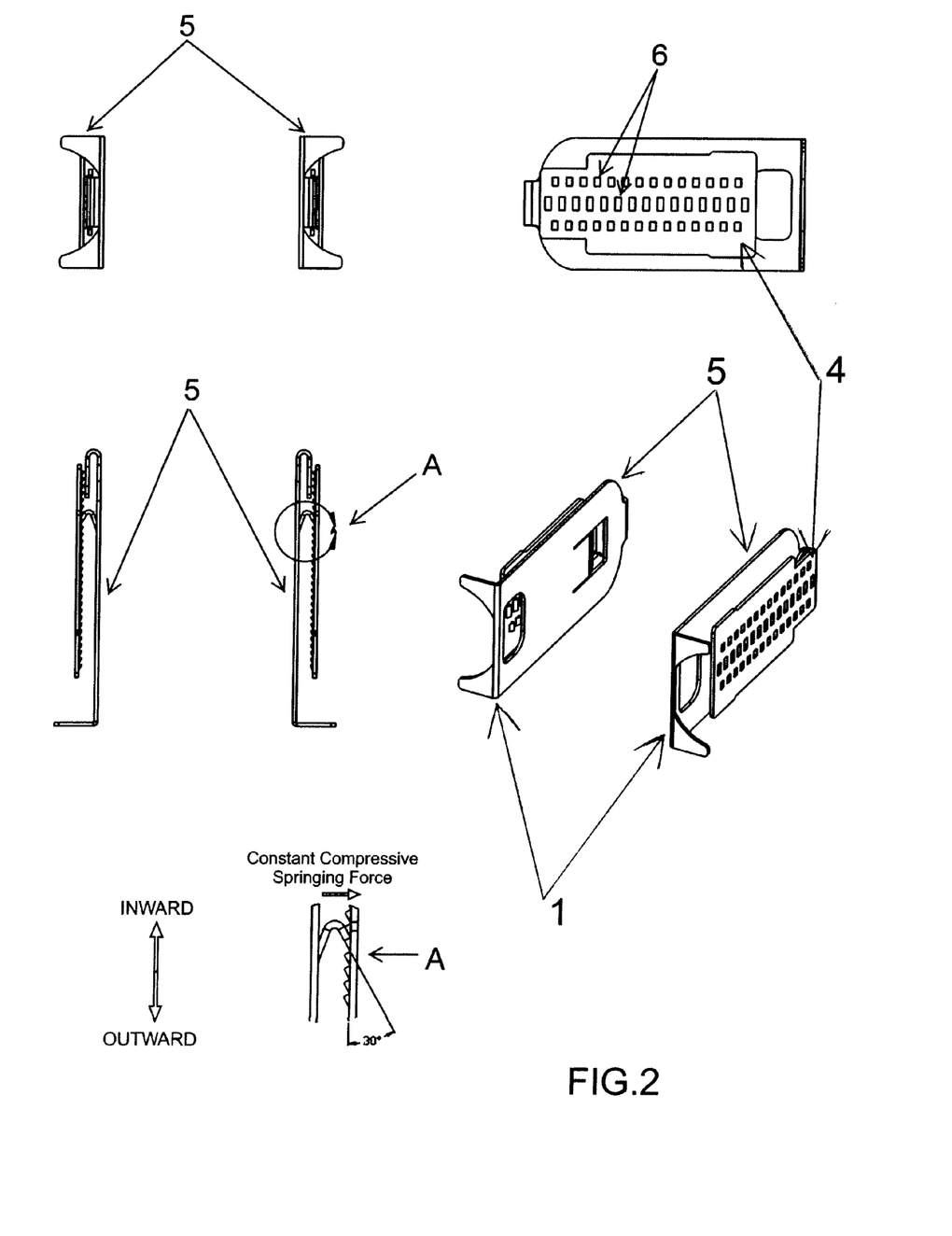
FIG. 2 shows an exemplary ratchet mechanism in three standard views and one trimetric view, according to some embodiments of the present invention.
Figure 3:
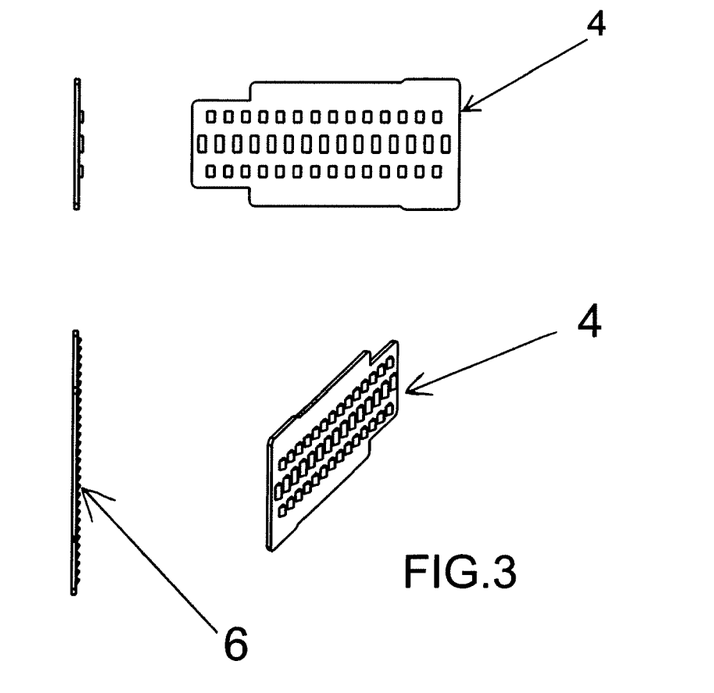
FIG. 3 shows an exemplary ratchet plate in three standard views and one trimetric view according to some embodiments of the present invention.

FIG. 2 shows an exemplary ratchet mechanism in three standard views and one trimetric view, and FIG. 3 shows an exemplary ratchet plate in three standard views and one trimetric view, according to some embodiments of the present invention. As shown in FIG. 2, the ratchet mechanism 1 includes two members. The first member is a flat rectangular shape sheet metal ratchet plate 4 that sits on two opposite sides of the stationary base frame 2. The surface of the ratchet plate 4 offers constant interval steps 6, for example, holes, bosses, or notches for the ratchet by means of cutouts or boss shaped patterns, as shown. In some embodiments, the steps 6 can be cut into the base frame tabs.

The other member is a spring 5 (for example, a steel or other metal ratchet spring), which also goes on both sides of the sliding box 3, in front of the pertinent pairing stationary ratchet plates 4. In some embodiments, the ratchet spring 5 is made of electrically conductive spring metal (e.g., steel) material. It is to be understood that the present invention is not limited to the disclosed specific shapes (rectangular, in this case) of the ratchet plate 4 and ratchet spring 5. Rather, the two members and their corresponding parts may be shaped differently from the disclosed rectangular shape. For example, ratchet plate 4 and/or ratchet spring 5 may have substantially square, circular, and/or other appropriate shapes, as needed.

Figure 4:
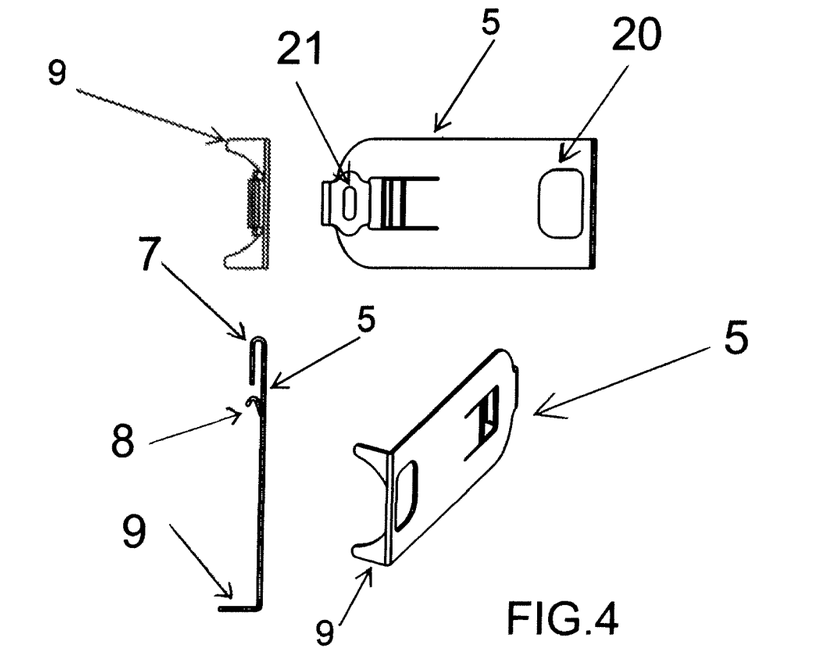
FIG. 4 shows an exemplary ratchet spring in three standard views and one trimetric view, according to some embodiments of the present invention.
Figure 5:
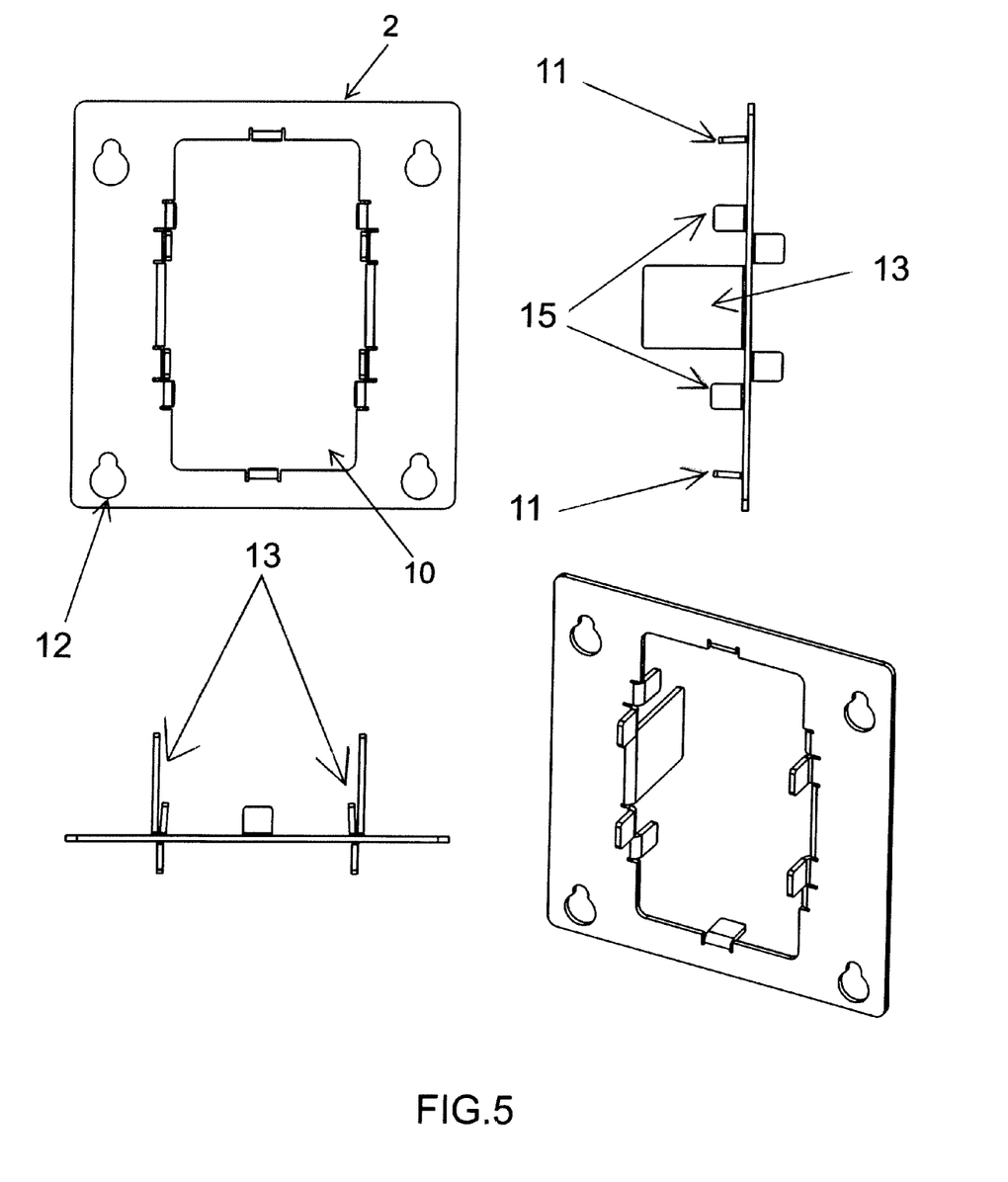
FIG. 5 shows an exemplary stationary base frame in three standard views and one trimetric view, according to some embodiments of the present invention.

FIG. 4 shows an exemplary ratchet spring in three standard views and one trimetric view and FIG. 5 shows an exemplary stationary base frame in three standard views and one trimetric view, according to some embodiments of the present invention. As shown, in some embodiments, the ratchet spring 5 is bent over at 180 degrees at one end 7 with a cutout 21 that facilitates hinged attachments to an embossed rib 19 on sliding insert 3 (see, FIG. 7), or it can be simply snapped on or welded on the sliding box 3. In some embodiments, the ratchet spring 5 includes an extruded angled mid tab 8 in the middle that engages the bosses, steps, holes, or cutouts on the ratchet plate 4, and an angled end tab 9 at the other end. In some embodiments, the angled end tab 9 may be bent by around 90 degrees. The tab and steps/holes are engaged at an angle that can vary from 1 degree to 90 degrees. For example, the angle in one embodiment is set at 30 degree (see, FIG. 2) for smoother sliding and more secure holdback as well as better grounding. The mid tab 8 serves as a grounding spring by applying a constant compressive springing force on two surfaces of contact. On the other end of the ratchet spring 5, a second optional (circular) cutout 20 may be provided for a better finger grip that is used for disengaging the spring tab from the ratchet plate.

By placing two fingers on the angled end tab 9 of each spring ratchet 5 and pushing the pair of spring tabs 15 towards one another, the extruded angled mid tab 8 is lifted off the steps 6 of the ratchet plate 4 and the sliding insert 3 is released from the stationary base frame 2 through the ratchet plate 4. The angled end tab 9 also serves to automatically adjust the assembly to the finished wall surface. The adjustment is done by pushing the sliding insert 3 inward until the two angled end tabs 9 rest against the exterior surface of the finished wall and stops any further travel, as shown in FIG. 10. At this point the sliding mechanism is locked by the negative angle of the ratchet plate 4 and ratchet spring 5 which restricts the outward travel. In the embodiments where the ratchet mechanism is reversed, the ratchet spring 5 is attached to the base frame and steps 6 are embedded in the sliding insert 3 either directly or via a serrated plate such as the ratchet plate 4 In this case, the tabs 5 are pushed away from one another to release the ratchet mechanism.

From the other direction, the wall bars any further inward travel by means of the angled end tabs 9, as shown in FIG. 11. The inward movement can further be restricted by setting the angled end tabs 9 at 90 degrees, but any inward or outward travel would only be possible by lifting the ratchet spring by holding the angled end tabs 9. The ratchet plate and ratchet spring can be located on the two side planes, the top and bottom planes or two planes on the opposite corners of the frame and insert. In some embodiments, the mechanism can be stamped out of the surface of the stationary base frame 2 and the surface of the sliding box insert 3, instead of using two separate components. Furthermore, although, the present invention is described by showing two ratchet mechanisms 1, it is readily understood by one skilled in the art that the AVR of the present invention can include only one ratchet mechanism 1.

Figure 6:
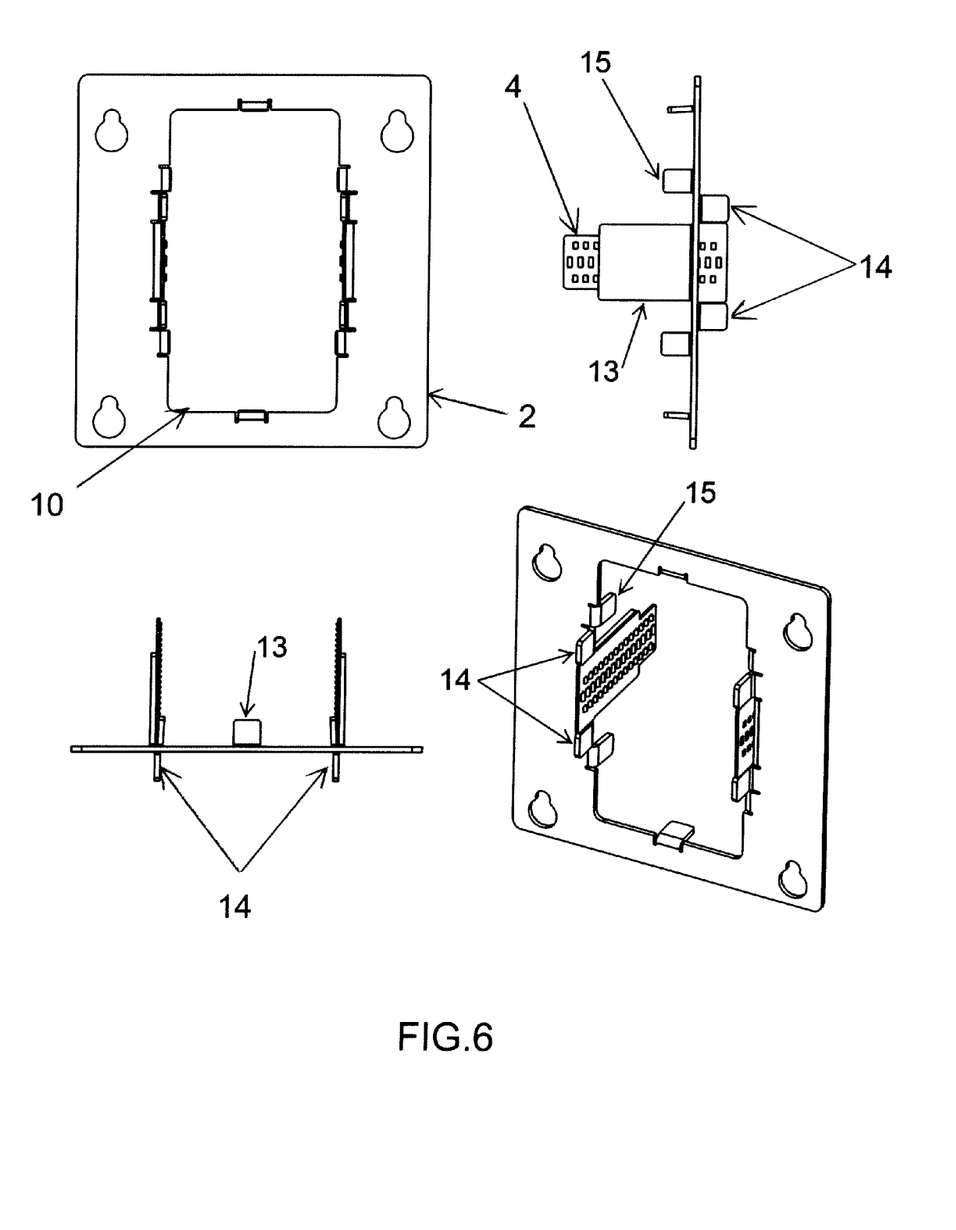
FIG. 6 shows an exemplary stationary base frame assembly which depicts the ratchet plates, according to some embodiments of the present invention.

FIG. 6 shows an exemplary stationary base frame assembly which depicts the ratchet plates, according to some embodiments of the present invention. In some embodiments, the stationary base frame 2 is a rectangular frame with a central (for example, rectangular) cutout 10 for the sliding insert assembly 3. The ratchet plates 4 are installed by riveting, pinning or welding them on support tabs 13 of the stationary base frame 2, provided on the reciprocal sides of the frame. The ratchet plates 4 form a 90 degree angle with respect to the base frame plane and parallel to the sliding direction of the sliding insert. In some embodiments, the ratchet plates 4 also have a number of sloped guiding tabs 11 and 15, which secure the reciprocal sliding of the insert as they provide more grounding. The guiding tabs 11 and 15 are in touch with the sliding insert 3. In some embodiments, a number of keyholes 12 are provided on the corners of the frame for mounting the stationary base frame on the junction outlet box. Two optional tabs 14 are bent outwards on each side to protect any damage to the ratchet plates while providing a smoother cutting process of the electrical device hole during installation of drywall.

Figure 7:
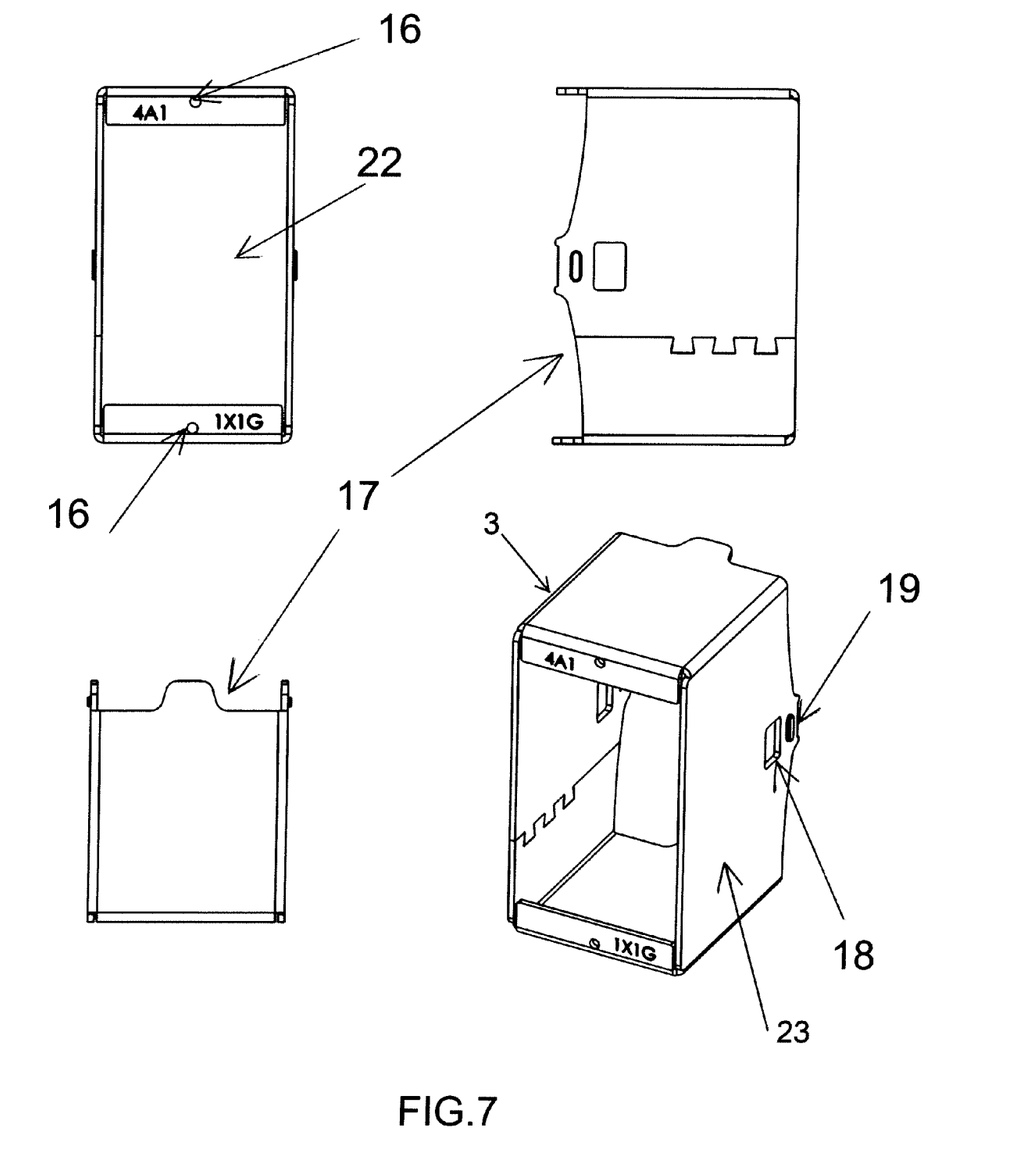
FIG. 7 shows an exemplary sliding boxed shaped insert in three standard views and one trimetric view, according to some embodiments of the present invention.
Figure 8:
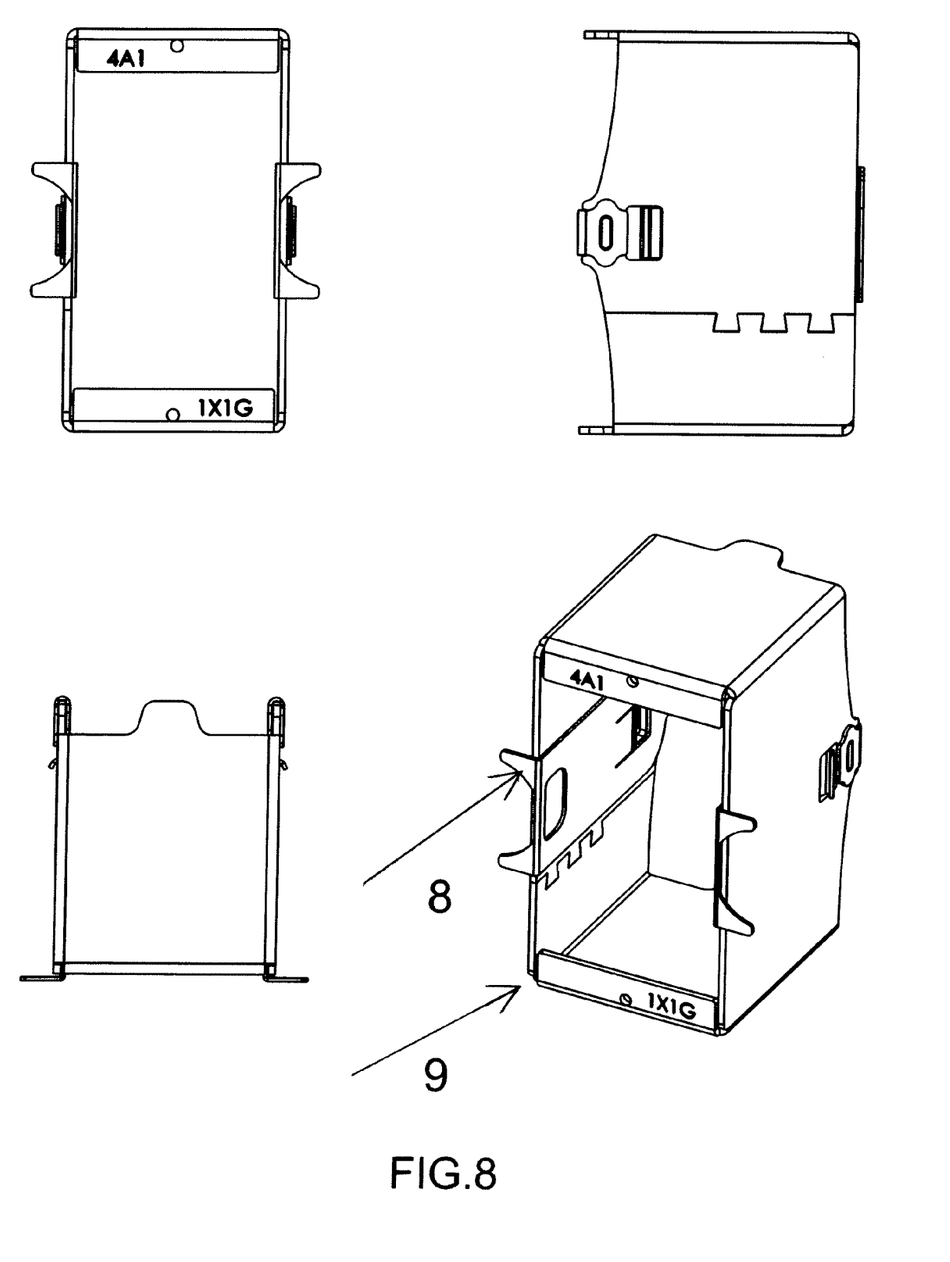
FIG. 8 shows an exemplary sliding boxed shaped insert assembly with the ratchet springs, according to some embodiments of the present invention.

FIG. 7 shows an exemplary sliding boxed shaped insert in three standard views and one trimetric view, and FIG. 8 shows an exemplary sliding boxed shaped insert assembly with the ratchet springs, according to some embodiments of the present invention. As shown, the sliding box shaped insert 3 includes a box shaped frame 23 that has a through out opening 22. In some embodiments, the ratchet springs that function as the sliding component of the ratchet mechanism are installed on each side of the frame 23 by welding, riveting, snapping or stamp joining in this case on the embossed ribs 19. In some embodiments, the box shaped frame 23 has curved shaped cutouts 17 in the back that provide more space inside the electric junction box for wires and electrical fittings. Two plates in the front face of the box on top and bottom are bent formed which have holes 16 for mounting electrical devices. There are two tab openings 18, one on each side of the box, which let the extruded angled mid tabs 8 out where they engage the ratchet plates. In lieu of safety and public protection, the care has been given throughout the system to minimize the openings and holes.

Figure 9:
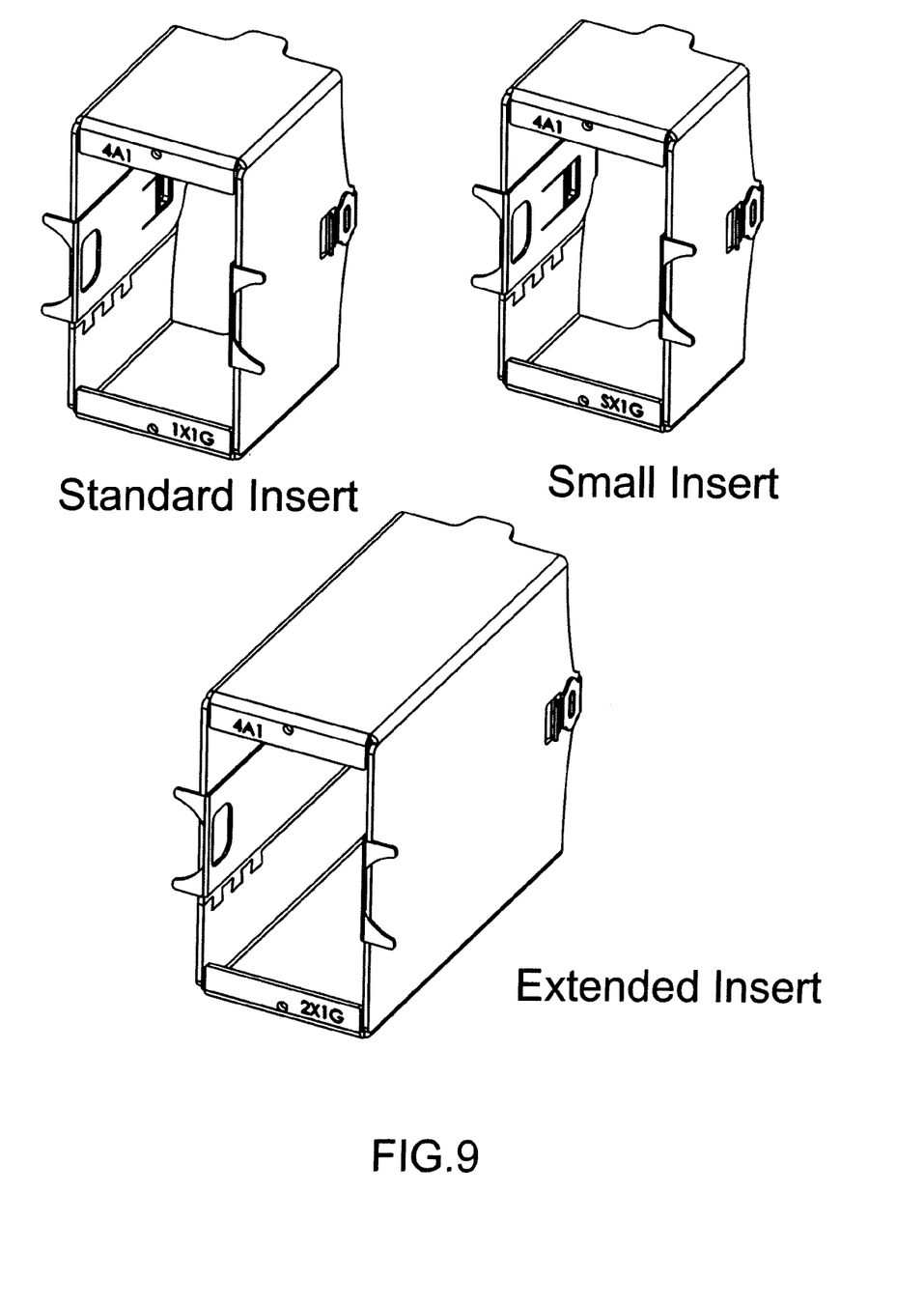
FIG. 9 shows exemplary three different sizes of sliding inserts in trimetric views, according to some embodiments of the present invention.

The inserts are coming in three optional sizes that ranges, for example, from ¼ inch thickness to 4 inch thickness, as shown in FIG. 9, and any of the inserts can be used based on the specific application. The first insert (small insert) goes up to 1½" and also fits on shallow junction boxes. The second insert (standard insert) goes up to 2" and is good on deep junction boxes. The third insert (extended insert) also mounts on the deep boxes and can accommodate up to 4" of wall thicknesses without use of an extension box. Other insert sizes can easily be accommodated by the AVR of the present invention, as need.

In some embodiments, the AVR can easily be modified to incorporate circular patterns for both the stationary base frame and the sliding insert to fit on all rounded electrical junction boxes.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the appended claims. For example, although the present invention is described by showing two ratchet mechanisms 1, it is readily understood by one skilled in the art that the AVR of the present invention can include only one ratchet mechanism.

What is claimed is:

1. An adjustable variable ring for electrical junction boxes comprising:
   a base frame having a guide tab;
   a sliding insert having a box shaped frame, a through opening, and a tab opening on a side of the box shaped frame, the sliding insert being configured to slide in and out of the base frame in the through opening using the guide tab; and
   a ratchet mechanism having:
   a ratchet plate secured to the base frame by an inner surface of the ratchet plate, and including a plurality of steps on an outer surface, and
   a ratchet spring installed on an inner wall of the box shaped frame and having a first end and a second end, the ratchet spring including an angled end tab at the first end, an angled mid tab between the first end and the second end and protruding from an inner wall of the box shaped frame to an outside of the box shaped frame through the tab opening for engaging one or more of the plurality of steps,
   wherein the sliding insert is configured to slide in and out of the base frame by disengaging the mid tab from the one or more of the steps by pressing on the end tab, and locks in the base frame by engaging the mid tab with the one or more of the plurality of steps.

2. The adjustable variable ring of claim 1, further comprising a second ratchet mechanism installed opposite to the ratchet mechanism, wherein the sliding insert is configured to slide in and out of the base frame by disengaging the mid tabs of the ratchet mechanism and the second ratchet mechanism from the one or more of the steps by pushing the end tabs of the ratchet mechanism and the second ratchet mechanism towards on another.

3. An electrical junction box comprising said adjustable variable ring according to claim 2.

4. The adjustable variable ring of claim 1, wherein the box shaped frame and the through opening are rectangular shaped.

5. An electrical junction box comprising said adjustable variable ring according to claim 4.

6. The adjustable variable ring of claim 1, wherein the box shaped frame and the through opening are circular shaped.

7. An electrical junction box comprising said adjustable variable ring according to claim 6.

8. The adjustable variable ring of claim 1, wherein the base frame includes a support tab for installing the ratchet plate.

9. The adjustable variable ring of claim 8, wherein the ratchet in installed on the support tab by one of the group consisting of riveting, pinning and welding.

10. An electrical junction box comprising said adjustable variable ring according to claim 9.

11. An electrical junction box comprising said adjustable variable ring according to claim 8.

12. The adjustable variable ring of claim 1, wherein the box shaped frame includes a rib on said side of the box shaped frame and the ratchet spring includes a first cutout at the second end for attachment to the rib.

13. The adjustable variable ring of claim 1, wherein the ratchet spring is installed on said inner wall of the box shaped frame by being snapped on, welded, riveted, or stamp joined on the box shaped frame.

14. The adjustable variable ring of claim 1, wherein the ratchet spring includes a second opening at the first end for finger grip.

15. The adjustable variable ring of claim 1, wherein the ratchet spring is made of electrically conductive spring metal material.

16. The adjustable variable ring of claim 1, wherein the plurality of steps on the outer surface of the ratchet plate are holes, bosses, or notches.

17. The adjustable variable ring of claim 1, wherein the angled end tab has an angle of approximately 90 degrees with respect to the ratchet spring.

18. The adjustable variable ring of claim 1, wherein the angled mid tab has an angle of approximately 30 degrees with respect to the ratchet spring.

19. The adjustable variable ring of claim 1, wherein the ratchet plate and the ratchet spring are located on two side planes, top and bottom planes, or two planes on opposite corners of the base frame and the sliding insert.

20. An electrical junction box comprising said adjustable variable ring according to claim 1.

* * * * *